United States Patent [19]
Gellert et al.

[11] Patent Number: 6,017,209
[45] Date of Patent: Jan. 25, 2000

[54] INJECTION MOLDING COOLED GATE INSERT

[75] Inventors: Jobst Ulrich Gellert, Georgetown; Denis L. Babin, Acton, both of Canada

[73] Assignee: Mold-Masters Limited, Georgetown, Canada

[21] Appl. No.: 09/036,909

[22] Filed: Mar. 9, 1998

[30] Foreign Application Priority Data

Feb. 2, 1998 [CA] Canada ................................. 2228458

[51] Int. Cl.$^7$ .................................................. B29C 45/72
[52] U.S. Cl. ........................................... 425/549; 425/552
[58] Field of Search ..................................... 425/549, 552

[56] References Cited

U.S. PATENT DOCUMENTS

| 4,622,001 | 11/1986 | Bright et al. | 425/549 |
| 5,443,381 | 8/1995 | Gellert | 425/549 |

Primary Examiner—Tim Heitbrink
Attorney, Agent, or Firm—Dalesman & Company

[57] ABSTRACT

An injection molding one-piece gate and cavity insert to be mounted between a heated nozzle and a cavity. The insert has cooling fluid passages extending through it around the gate and cavity. The passages alternately extend both forwardly and rearwardly and inwardly and outwardly to improve cooling.

12 Claims, 3 Drawing Sheets

INJECTION MOLDING COOLED GATE INSERT

BACKGROUND OF THE INVENTION

This invention relates generally to injection molding apparatus and more particularly to a one-piece gate and cavity insert having one or more cooling fluid flow passages extending therethrough which alternately extend both forwardly and rearwardly and inwardly and outwardly.

Injection molding gate and cavity inserts having cooling fluid flow passages which form a portion of the cavity and through which the gate extends to convey melt from a heated nozzle to the cavity are well known. For example, U.S. Pat. No. 4,622,001 to Bright et al. which issued Nov. 11, 1986 shows a two-piece insert with a cooling fluid flow passage or chamber which alternately extends radially inwardly and outwardly to improve cooling by lengthening the cooling fluid flow path and bringing the cooling fluid into closer proximity with the cavity. U.S. Pat. No. 5,443,381 to Gellert which issued Aug. 22, 1995 shows a one-piece gate and cavity insert having rib portions which cause the cooling fluid flow chambers or passages to alternately extend forwardly and rearwardly to provide improved cooling and more structural strength.

While these previous configurations are satisfactory for many applications, when molding certain materials with certain cavity configurations and sizes, it is desirable to provide even additional cooling to the cavity and the gate area.

SUMMARY OF THE INVENTION

Accordingly, it is an object of the present invention to at least partially overcome the disadvantages of the prior art by providing one-piece cooled gate and cavity inserts having one or more cooling fluid flow passages alternately extending both forwardly and rearwardly and inwardly and outwardly.

To this end, in one of its aspects, the invention provides an injection molding one-piece gate and cavity insert to be mounted in a mold between a heated nozzle and a cavity. The gate and cavity insert has a rear surface with a recessed portion which receives the nozzle and a front surface which provides a portion of a rear surface of the cavity. A gate extends centrally through the gate and cavity insert from the rear surface to the front surface to convey melt from the nozzle to the cavity. The gate and cavity insert has an outer surface with one or more cooling fluid inlets and outlets extending inwardly therefrom. The gate and cavity insert also has one or more cooling fluid flow passages extending therethrough from one of the cooling fluid inlets to the one of cooling fluid outlets. Each cooling fluid flow passage in the gate and cavity insert alternately extends both forwardly and rearwardly and inwardly and outwardly.

Further objects and advantages of the invention will appear from the following description taken together with the accompanying drawings.

DETAILED DESCRIPTION OF THE INVENTION

Figure 1:
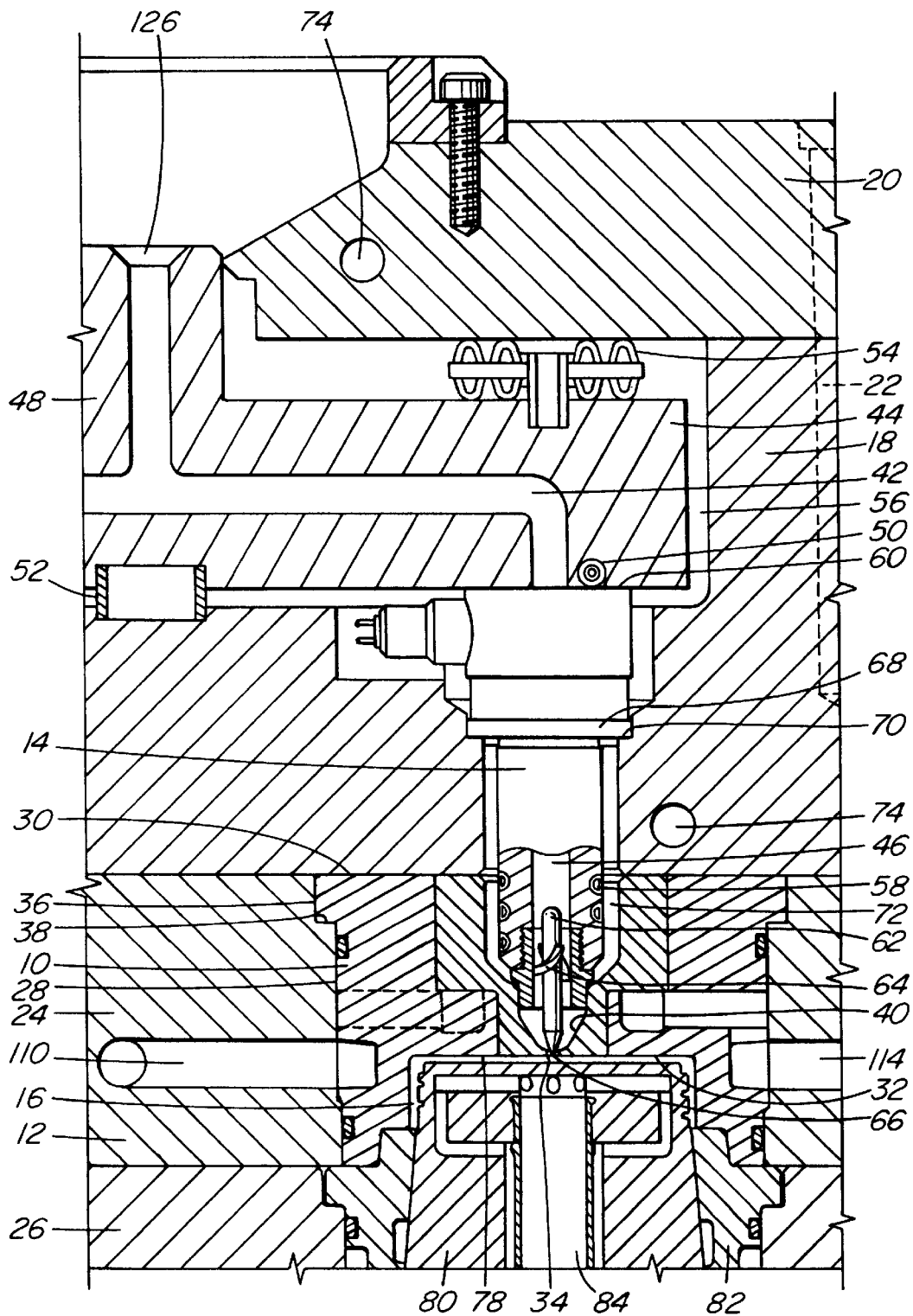
FIG. 1 is a sectional view of a portion of a multi-cavity injection molding system showing a gate and cavity insert according to a preferred embodiment of the invention.

Reference is first made to FIG. 1 which shows or portion of a multi-cavity injection molding system or apparatus having a one-piece gate and cavity insert 10 according to a preferred embodiment of the invention mounted in a mold 12 between a heated nozzle 14 and a cavity 16. While the mold 12 can have a greater number of plates depending upon the application, in this case, only a nozzle retainer plate 18 and a back plate 20 secured together by bolts 22, as well as a cavity retainer plate 24 and a stripper plate 26 are shown for ease of illustration.

Each gate and cavity insert 10 has an outer surface 28, a rear surface 30, a front surface 32 and a gate 34 extending centrally therethrough from the rear surface 30 to the front surface 32 to convey melt from the nozzle 14 to the cavity 16. The outer surface 28 is generally cylindrical with an outwardly extending circular flange portion 36 which sits in a circular seat 38 in the cavity retainer plate 24 to accurately locate the gate and cavity insert 10 in the mold 12. The rear surface 30 of the gate and cavity insert 10 has a recessed portion 40 which forms a nozzle well to receive the heated nozzle 14.

A melt passage 42 branches in a steel melt distribution manifold 44 and extends through a central melt bore 46 in each heated nozzle 14 to the gate 34 leading to the cavity 16. The melt distribution manifold 44 has a cylindrical inlet portion 48 and is heated by an integral electrical heating element 50. The melt distribution manifold 44 is mounted between the nozzle retainer plate 18 and the back plate 20 by a central locating ring 52 and a number of insulative and resilient spacer members 54 which provide an insulative air space 56 between the heated manifold 44 and the surrounding mold 12.

Each nozzle 14 has an integral electrical heating element 58 and a rear end 60 which abuts against the melt distribution manifold 42. In this configuration, a torpedo 62 with spiral blades 64 and a pointed forward tip 66 is mounted in each heated nozzle 14. Each heated nozzle 14 also has a flange portion 68 which fits in a circular seat 70 in the manifold retainer plate 18. This accurately locates the heated nozzle 14 with the pointed tip 66 of the torpedo 62 in alignment with the gate 34 and provides an insulative air space 72 between the heated nozzle 14 and the surrounding mold 12 which is cooled by pumping cooling fluid through cooling conduits 74.

In this embodiment, a portion of the front surface 32 of the gate and cavity insert 10 forms the rear surface 78 of the cavity 16. In this case the cavity 16 is for making container closures and extends between the gate and cavity insert 10 and a mold core 80 which extends through a stripper ring 82. The mold core 80 is cooled by cooling water flowing through a central cooling channel 84.

Figure 2:
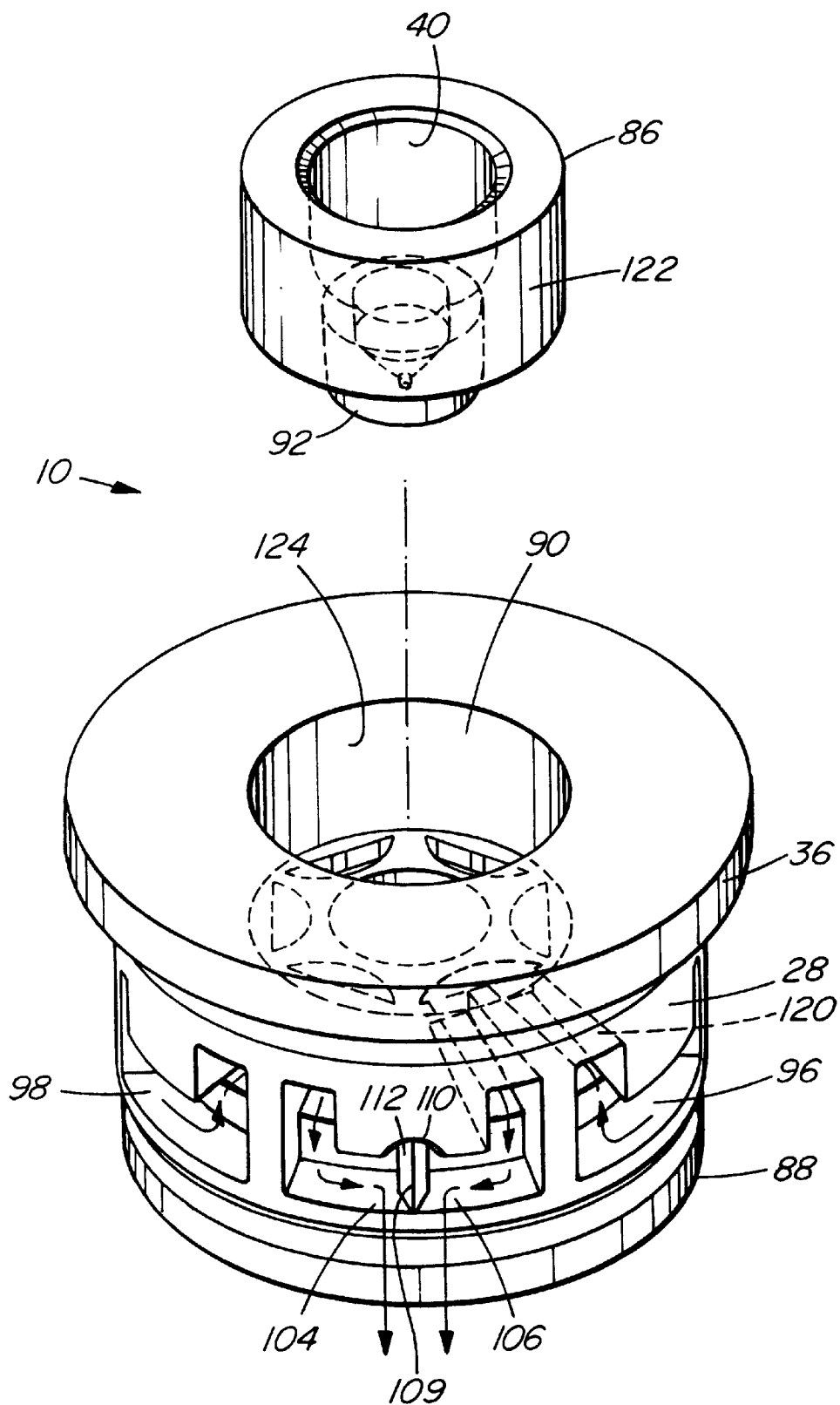
FIG. 2 is an isometric view showing inner and outer portions of the gate and cavity insert seen in FIG. 1, in position for assembly.
Figure 3:
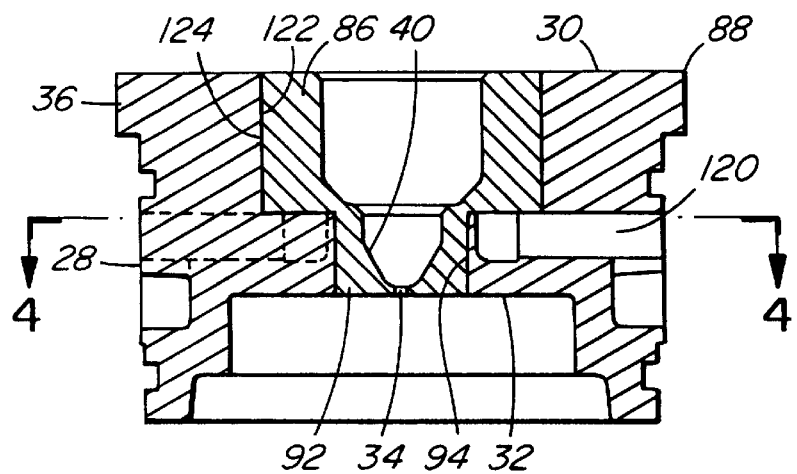
FIG. 3 is a cross-sectional view of the assembled gate and cavity insert shown in FIG. 1.
Figure 4:
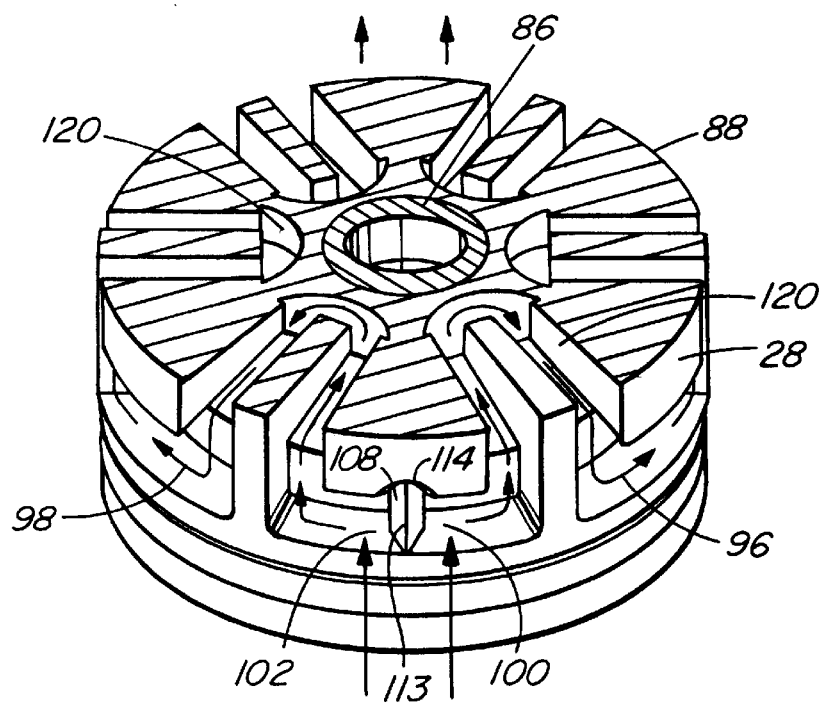
FIG. 4 is an isometric view of the gate and cavity insert cut-away along line 4—4 in FIG. 3.

Reference is now made to FIGS. 2–4 to describe in detail the gate and cavity insert 10 according to the invention. As seen in FIG. 2, the gate and cavity insert 10 consists of a generally cylindrical inner portion 86 and a generally cylindrical outer portion 88. The outer portion 88 is normally made of a suitable seal such as stainless steel and the inner portion 86 is preferably made of H13 tool steel which is more conductive and heat-shock resistant. The inner portion 86 fits into a central cylindrical opening 90 in the outer portion 88. The inner portion 86 has a forwardly extending cylindrical nose portion 92 with the gate 34 extending through it which fits into a smaller cylindrical opening 94 to form part of the front surface 32 of the gate and cavity insert 10. As can be seen, the inner portion 86 froms the nozzle well 40 into which the heated nozzle 14 extends.

Figure 5:
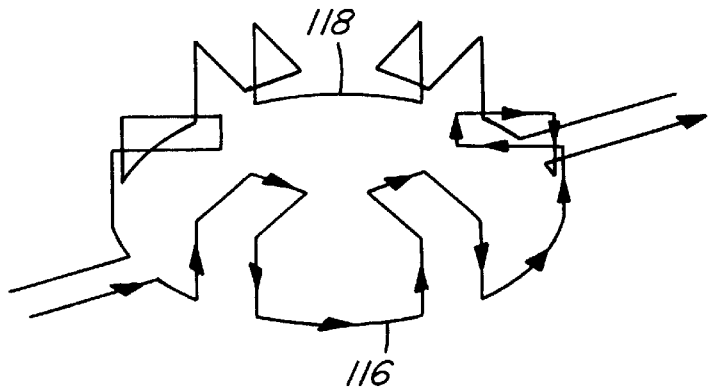
FIG. 5 is a schematic view of the paths of the cooling fluid flow passages through the gate and cavity insert seen in FIG. 1.

The outer portion 88 of the gate and cavity insert 10 has the generally cylindrical outer surface 28 extending forwardly from the outwardly extending flange portion 36. In this embodiment, it is machined to have two cooling fluid flow passages 96, 98 extending in tortuous paths therethrough. The flow passages 96, 98 extend respectively from a pair of cooling fluid inlets 100, 102 extending inwardly from the outer surface 28 to a pair of outlets 104, 106 extending outwardly to the outer surface 28. The outlets 104, 106 are opposite the inlets 100, 102, and the two cooling fluid passages 96, 98 extend around the gate and cavity insert 10 in opposite directions from each other. Referring also to FIG. 1, the two cooling fluid inlets 100, 102 with a thin partition 108 between them are aligned with a cooling fluid conduit 110 extending through the cavity retainer plate 24 to receive a suitable cooling fluid such as water. The two cooling fluid outlets 104, 106 also have a thin partition 112 between them and are similarly aligned with another cooling fluid conduit 114 extending through the cavity retainer plate 24 to receive the cooling fluid from them. The partitions 108, 112 have knife edges 109, 113 to avoid water flow restrictions. The tortuous paths 116, 118 of the two cooling fluid flow passages 96, 98 are best seen in FIGS. 4 and 5. Each of the passages 96, 98 first extends a short distance circumferentially, then a short distance rearwardly, then inwardly and outwardly through a U-shaped portion 120 of the passage, then a short distance back forwardly, and then circumferentially again. In the configuration shown, this recurring flow path or pattern is repeated three times between each inlet 100, 102 and outlet 104, 106. This path or pattern of the cooling fluid flow passages 96, 98 alternately extending both forwardly and rearwardly and inwardly and outwardly provides the advantages of extending the length of the flow passages, increasing turbulent flow, and bring the flow passages closer to the cavity 16, all of which improve cooling efficiency, while maintaining structural strength of the mold which is constantly subjected to high clamp pressures.

The gate and cavity insert 10 is made by inserting the inner portion 96 into the outer portion 88. A nickel alloy brazing paste is applied along the joints between them and they are gradually heated in a vacuum furnace to a temperature of approximately 1925° F. which is above the melting point of the nickel alloy. As the furnace is heated, it is evacuated to a relatively high vacuum to remove substantially all of the oxygen and then partially backfilled with an inert gas such as argon or nitrogen. When the melting point of the nickel alloy is reached, it melts and flows between the outer surfaces 122 of the inner portion 86 and the inner surfaces 124 of the outer portion 88. The nickel alloy spreads between the surface 122, 124 by capillary action to integrally braze the two portions 86, 88 together to form the one-piece gate and cavity insert 10. Brazing them together this way in the vacuum furnace provides a metallurgical bonding of the nickel alloy to the steel to maximize the strength of the insert and prevent leakage of cooling water.

In use, the injection molding apparatus or system is assembled as shown in FIG. 1. While only a single cavity 16 has been shown for ease of illustration, it will be appreciated that the melt distribution manifold 44 normally has many more melt passage branches extending to numerous cavities 16 depending upon the application. Electrical power is applied to the heating elements 50, 58 in the manifold 44 and nozzles 14 to heat them to a predetermined operating temperature. Water or another suitable cooling fluid at predetermined temperatures is supplied to the cooling channel 84 and the cooling conduits 74 and 110 to cool the mold 12 and the gate and cavity inserts 10. Hot pressurized melt is then injected from a molding machine (not shown) into the melt passage 42 through a central inlet 126 according to a predetermined cycle in a convention manner. The melt flows through the melt bores 46 in the heated nozzles 14 and the gates 34 into the cavities 16. When the cavities 16 are full, injection pressure is held momentarily to pack and then released. After a short cooling period, the mold 12 is opened for ejection. After ejection, the mold 12 is closed and melt injection pressure is reapplied to refill the cavities 16. This cycle is repeated continuously with a frequency depending upon the size of the cavities 16 and the type of material being molded.

While the description of the injection molding one-piece gate and cavity insert having cooling fluid flow passages has been given with respect to a preferred embodiment of the invention, it will be evident that various other modifications are possible without departing from the scope of the invention as understood by those skilled in the art and as defined in the following claims. For instance, in an alternate embodiment there can be only one flow passage extending around the gate and cavity insert 10 from an inlet adjacent an outlet with the flow passage having the same recurring path or pattern described above.

The embodiments of the invention in which an exclusive property or privilege is claimed is defined as follows:

1. In an injection molding one-piece gate and cavity insert (10) to be mounted in a mold (12) between a heated nozzle (14) and a cavity (16), the gate and cavity insert (10) having a rear surface (30) with a recessed portion (40) which receives the nozzle (14), a front surface (32) which provides at least a portion of a rear surface (78) of the cavity (16), a gate (34) extending centrally therethrough from the rear surface (30) to the front surface (32) to convey melt from the nozzle (14) to the cavity (16), and an outer surface (28) with at least one cooling fluid inlet and at least one cooling fluid outlet extending inwardly therefrom, the gate and cavity insert (10) also having at least one cooling fluid flow passage extending therethrough from the cooling fluid inlet to the cooling fluid outlet, the improvement wherein;

said gate and cavity insert (10) is formed of an inner gate portion (86) and an outer cavity portion (88) metallurgically bonded together, the outer cavity portion (88) forms a portion of the surface (78) of the cavity (16), the at least one cooling fluid flow passage in the gate and cavity insert (10) alternately extends both forwardly and rearwardly and inwardly and outwardly, and the at least one cooling fluid flow passage extends only through the outer cavity portion (88).

2. A one-piece gate and cavity insert (10) as claimed in claim 1 wherein the outer surface (28) is generally cylindrical.

3. A one-piece gate and cavity insert (10) as claimed in claim 2 wherein there are two cooling fluid inlets (100, 102), two cooling fluid outlets (104, 106) opposite the cooling fluid inlets (100, 102) and two cooling fluid flow passages (96, 98), the cooling fluid flow passages (96, 98) each extending around the gate and cavity insert (10) from a cooling fluid inlet to a cooling fluid outlet in opposite directions from each other.

4. A hot runner injection molding apparatus comprising a nozzle (14) and a gate and cavity insert (10) mounted adjacent the nozzle (14), the gate and cavity insert (10) having an inner gate portion (86) and an outer cavity portion (88) metallurgically bonded together, the inner gate portion (86) having a gate (34) leading to a cavity (16) and the outer cavity portion (88) forming a portion of the surface (78) of a cavity (16) and having at least one cooling fluid flow channel extending both radially and circularly around the gate (34).

5. An injection molding apparatus as claimed in claim 4 wherein the inner gate portion (86) of the gate and cavity insert (10) has an outer surface (122) which at least partially closes the at least one fluid flow channel.

6. An injection molding apparatus as claimed in claim 4 wherein the gate and cavity insert (10) is seated in a mold (12), the mold (12) being in contact with the outer cavity portion (88) and at least partially closing the at least one cooling fluid flow channel.

7. An injection molding apparatus as clawed in claim 4 wherein the gate portion (86) is made of a material having a higher thermal conductivity than the outer cavity portion (88).

8. An injection molding apparatus as claimed in claim 4 wherein the at least one cooling fluid channel has a configuration whereby cooling fluid flow therethrough is turbulent.

9. A hot runner injection molding apparatus comprising a nozzle (14) and a gate and cavity insert (10) mounted adjacent the nozzle (14), the gate and cavity insert (10) having an inner gate portion (86) in contact with an outer cavity portion (88), the inner gate portion (86) having a gate (34) leading to a cavity (16) and the outer cavity portion (88) forming a portion of the surface (78) of a cavity (16) and having at least one cooling fluid flow channel extending both radially and circularly around the gate (34).

10. An injection molding apparatus as claimed in claim 9 wherein the inner gate portion (86) and the outer cavity portion (88) are metallurgically bonded together.

11. A hot runner injection molding apparatus comprising a plurality of nozzles (14) extending from a melt distribution manifold (44), and a gate and cavity insert (10) mounted adjacent each nozzle (14), each gate and cavity insert (10) having an inner gate portion (86) and an outer cavity portion (88), the inner gate portion (86) having a gate (34) leading to a cavity (16), the outer cavity portion (88) forming at least a portion of the surface (78) of the cavity (16) and having at least one cooling fluid flow channel extending both radially and circularly around the gate (34).

12. An outer cavity portion (88) of a gate and cavity insert (10) that forms a portion of the surface (78) of an injection molding cavity (16) having at least one cooling fluid flow channel extending both radially and circularly around a gate (34) leading to the cavity (16).

* * * * *